March 7, 1961 L. NAMENYI-KATZ 2,974,056

MAGNETIC RECORDING MEDIA

Filed Dec. 9, 1957

Inventor
L. Namenyi-Katz
By Glascock Downing & Seebold
Attys.

2,974,056
Patented Mar. 7, 1961

2,974,056

MAGNETIC RECORDING MEDIA

Laszlo Namenyi-Katz, London, England, assignor to Epsylon Research & Development Company Limited, Bedfont, England Filed Dec. 9, 1957, Ser. No. 701,641

Claims priority, application Great Britain May 13, 1957

8 Claims. (Cl. 117—8)

This invention relates to magnetic recording media.

Known magnetic media are of two distinct varieties, namely, various types of steel wires, steel bands or non-ferrous wires and bands with electro-plated magnetic materials on them, and magnetic-oxide-coated plastic ribbons or tapes, commonly referred to as magnetic tape. Magnetic tape is more popular in use as it provides better performance than the magnetic media of the first variety. Steel wires, however, show an advantage in use having smaller physical volume occupied by them than those of magnetic tapes for a given duration.

The present invention relates more particularly to a kind of magnetic recording medium which is a very fine extruded filament of a plastic of high tensile strength, coated with a film of, or homogeneously mixed with, fine magnetic powder or suspension. The mixing is effected before or during extrusion.

Suitable plastics are nylon, polyester or regenerated cellulose.

The plastic filament is conveniently a cold drawn high tensile nylon filament of preferably ½ to 6-thousandths of an inch in diameter.

The magnetic powder is conveniently $\gamma$ oxide of particle size up to 1 mu but might also be a ferrite.

The powder is conveniently suspended with nitro-cellulose in a solvent such as cellulose acetate or ethyl cellulose with an additive which acts as a nylon solvent such as a phenolic additive to ensure that the coating is bonded to the nylon.

Alternatively, the powder may be suspended in an epoxy-resin solution, or an epoxy-polyamide resin solution, a vinyl modified phenolic resin solution or an alkyl resin solution.

It has been proposed to produce a magnetic recording medium of the kind described, stretching it after coating to a uniform thickness. This method is quite unfeasible as it is not possible to manufacture the medium itself with better than a ±10% accuracy of diameter. Non-uniform thickness would make it impossible to record a concentric field around the medium of uniform level especially as it is desired to record the signal in a circular head, the filament being disposed in the centre of the magnetic field and out of contact but replayed in contact in circular head touching one side of the ring or in a one sided head. If the thickness of the medium would greatly vary, the signal level on the periphery of the filament would also vary, therefore an amplitude variation would occur dependent on the diameter of the filament and distance of the magnetic recording gap.

The invention consists of a magnetic recording medium of the kind described, ground or polished to a uniform thickness.

The invention will be further described with reference to the accompanying drawings, in which.

Figures 1, 2, 3, 4, 5, 6, 7, 8, 9, 10:
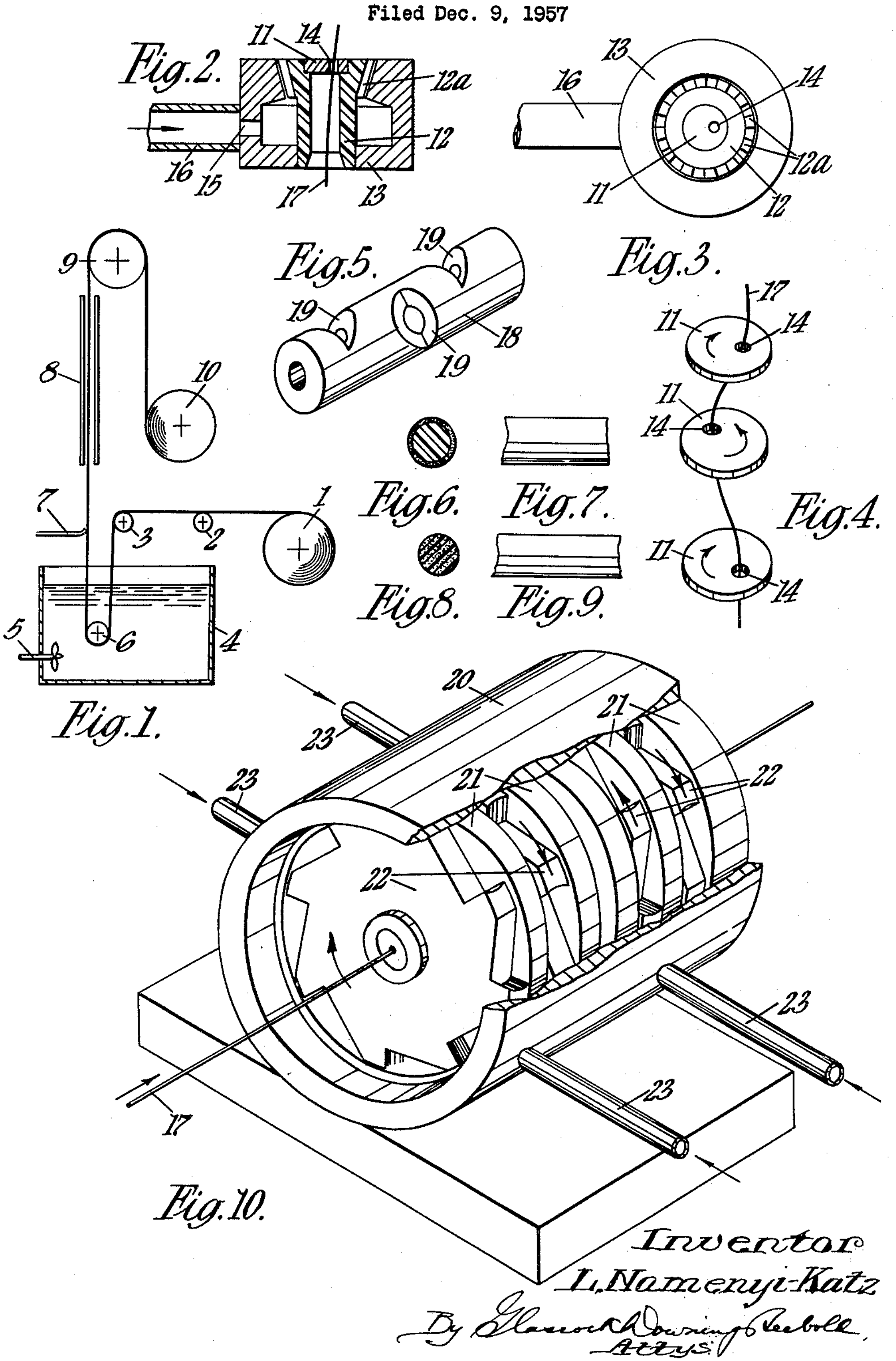
Figure 1 is a diagrammatic representation of a filament coating apparatus.
Figure 2 is a section through the axis of a grinding arrangement to be used for making filaments according to the invention.
Figure 3 is an end elevation of the top of the arrangement of Figure 2.
Figure 4 is a diagrammatic view of the layout of the central grinding member of a plurality of arrangements according to Figures 2 and 3.
Figure 5 is an alternative grinding arrangement.
Figure 6 is a transverse section of a filament according to the invention.
Figure 7 is a fragmentary side elevation of the same.
Figure 8 is a transverse section of a further form of filament according to the invention.
Figure 9 is a fragmentary side elevation of the same.
Figure 10 is a perspective view of a further alternative grinding arrangement.

As shown in Figure 1, the thread is drawn off reel 1 over a constant speed capstan drive 2 and pulley 3 down into coating bath 4 with stirrer 5, over pulley 6 in the bath and then vertically upwards past a wiper 7 and through an oven 8.

From the oven it passes over a polyethylene or polyethylene tetrafluoride pulley 9 down to a take-up spool 10 which is driven at constant torque from an electromotor.

The thread may require to be degreased before being coated. The speed of running in and viscosity of the bath are adjusted to give the desired coating thickness.

If the coating is arranged to be of the kind which irreversibly sets under the heating action of the oven then further coatings may be applied one on top of the other.

The oven temperature is arranged to be at about 120° C.

After coating the thread may be ground or polished to a specified diameter as follows:

A number of discs 11 (Figures 2 and 3) of suitable diameter made of steel or other hard materials are fitted with a rim 12 made of low friction coefficient plastic material. The rim around the periphery at one end is formed into tooth shaped turbine blades **12*a* and fitted into a bush 13 which locates around the periphery and also on both edges of the plastic turbine shaped ring. A small hole 14 is drilled in the centre of the disc placed eccentrically to the axis. If air is blown in through a hole 15 of the locating ring 13 at the periphery from a pipe 16 or through a number of holes, the disc is caused to rotate at high speed and the filament 17 may be passed through this eccentrically positioned hole and thus subjected to a grinding operation. A number of similar apparatuses are placed near to each other in consecutive order as shown (Figure 4) and a filament 2** threaded through all of them, each having a hole slightly smaller than the previous one until the final one has a hole of the desired final diameter.

Each disc is kept rotating in either uniform direction or alternative directions by compressed air which would keep the discs rotating but also would blow away the dust particles so removed from the coated filament.

An alternative method of grinding shown in Figure 5 is where an inverted broach 18 would be formed of tungsten or similar extremely hard materials through which the nylon filament may be pulled and which may have connection through slots 19 externally and while the filament is pulled through such broach, the dust may be blown or washed away with suitable lubricant.

A further method may be used by having a number of centerless grinding systems meeting where opposite running grinding wheels would be placed in contact with the filament which is at a uniform speed pulled through a conventional centreless grinding device of suitable small dimensions.

It is essential that while the filament is being reduced to uniform diameter it should be done through means whereby the filament may not be strained to its elongation point, in particular beyond the limit of plastic stress memory of the medium.

The thread filament obtained according to the invention is illustrated in Figures 6 and 7, Figures 8 and 9 show an alternative form of filament in which the magnetic particles are mixed with the plastic before extrusion and which may also be polished and ground to uniform thickness in accordance with the invention.

The grinding arrangement of Figure 10 comprises a cylinder 20 fitted with six spaced discs 21 each having a fine central aperture, the front disc 21 having been removed to show further details.

Between the first and second, second and third, fourth and fifth and fifth and sixth discs are arranged toothed members 22 made of plastic material of low friction coefficient and having an inner hub portion of hard steel or other grinding material which has a central aperture, the centre of which is offset in relation to the axis of the cylinder.

Tubes 23 are provided for blowing compressed air into the cylinder to turn alternate toothed members 22 in alternate directions. The air escapes through the central apertures, thereby blowing away any dust formed in the grinding.

The thread 17 passes through the central apertures.

The thread when pulled tends to move towards the cylindrical axis and is thus ground on all sides by the rotating toothed members. The inner edge of the grinding aperture can of course be on the cylindrical axis.

I claim:

1. A method of reducing a magnetic recording filament to a uniform diameter comprising passing said filament under tension through a rotating die having an eccentric aperture, whereby small particles are removed from the surface of said filament by the edges of said aperture due to the eccentric rotation thereof.

2. A method of reducing a magnetic recording filament to a uniform diameter comprising passing said filament under tension progressively through a plurality of spaced dies rotating asynchronously and having eccentric die apertures, whereby small particles are removed from the surface of said filament by the edges of said apertures due to the eccentric movement thereof.

3. Apparatus for reducing a magnetic recording filament to a uniform diameter comprising a die plate rotatable in its own plane about an axis, a die aperture eccentric with said axis, and means to rotate said die plate about said axis, the eccentric rotation of the edges of said die aperture causing small particles to be removed from the surface of said filament on being passed through said die under tension.

4. Apparatus as claimed in claim 3 comprising a rotatable disc including impeller means adapted to be driven by compressed air, said die plate being mounted on said disc.

5. Apparatus for reducing a magnetic recording filament to a uniform diameter comprising a plurality of spaced die plates rotatable in their own planes about a common axis, a die aperture in each plate eccentric with said axis, and means to rotate said die plates asynchronously, said filament being passed progressively through said apertures and small particles being removed from the surface thereof due to the eccentric movement of said apertures.

6. Apparatus as claimed in claim 5 wherein said rotating means are so arranged that successive die plates rotate in opposite direction.

7. Apparatus as claimed in claim 5 comprising a rotatable disc including impeller means for each of said die plates, each of said die plates being mounted on the associated disc, and compressed air means to rotate said discs.

8. Apparatus as claimed in claim 7 wherein said impeller means and said compressed air means are so arranged that successive discs rotate in opposite directions.

References Cited in the file of this patent

UNITED STATES PATENTS

| | | |
|---|---|---|
| 1,717,554 | Fraser | June 18, 1929 |
| 1,978,060 | Rickert | Oct. 23, 1934 |
| 2,202,428 | Poock | May 28, 1940 |
| 2,233,928 | Weaver | Mar. 4, 1941 |
| 2,267,342 | Schwartz | Dec. 23, 1941 |
| 2,394,383 | Hopkins | Feb. 5, 1946 |
| 2,497,407 | Green | Feb. 14, 1950 |
| 2,566,441 | Camras | Sept. 4, 1951 |
| 2,679,680 | Hanks | June 1, 1954 |

FOREIGN PATENTS

| | | |
|---|---|---|
| 12,275 | Great Britain | Aug. 24, 1895 |
| 101,309 | Great Britain | June 24, 1937 |